(12) United States Patent
Grady

(10) Patent No.: US 12,219,902 B2
(45) Date of Patent: *Feb. 11, 2025

(54) BALING APPARATUS AND METHOD

(71) Applicant: Michael Jason Grady, Floravista, NM (US)

(72) Inventor: Michael Jason Grady, Floravista, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,994

(22) Filed: Jul. 6, 2023

(65) Prior Publication Data
US 2024/0000020 A1  Jan. 4, 2024

Related U.S. Application Data

(63) Continuation of application No. 17/127,112, filed on Dec. 18, 2020, now abandoned, and a continuation of application No. 16/025,751, filed on Jul. 2, 2018, now Pat. No. 10,869,428.

(51) Int. Cl.
| | |
|---|---|
| *A01F 15/08* | (2006.01) |
| *A01F 15/04* | (2006.01) |
| *B30B 9/30* | (2006.01) |

(52) U.S. Cl.
CPC .......... *A01F 15/0875* (2013.01); *A01F 15/04* (2013.01); *B30B 9/3014* (2013.01)

(58) Field of Classification Search
CPC ...... A01F 15/08; A01F 15/04; A01F 15/0875; A01F 15/005; A01F 2015/102; B30B 9/3003; B30B 9/3014; Y10T 83/8752; Y10T 83/9493; A01D 80/00; A01D 78/001; A01D 85/005; A01D 2085/007; A01D 2085/008; A01D 87/122; A01D 90/02; A01D 90/08; A01D 90/10; A01D 90/105
See application file for complete search history.

(56) References Cited

U.S. PATENT DOCUMENTS

| | | | | |
|---|---|---|---|---|
| 2,478,012 A | * | 8/1949 | Raney | A01F 15/0825 |
| | | | | 100/150 |
| 3,099,203 A | * | 7/1963 | Klemm | A01F 15/08 |
| | | | | 100/98 R |
| 3,243,028 A | * | 3/1966 | Tufts | A01D 87/12 |
| | | | | 100/188 R |
| 4,518,124 A | * | 5/1985 | Klinner | A01F 29/04 |
| | | | | 241/101.76 |
| 4,763,574 A | * | 8/1988 | Ast | A01F 15/005 |
| | | | | 100/98 R |
| 5,742,010 A | * | 4/1998 | Griffin | G01G 19/08 |
| | | | | 177/253 |

(Continued)

FOREIGN PATENT DOCUMENTS

GB     2061095 A  *  5/1981  ............ A01D 90/04

*Primary Examiner* — Jimmy T Nguyen

(57) ABSTRACT

Baling apparatus and method including a baling chamber having one or more splitting knives for dividing crop material picked up from a field to discharge divided bales simultaneously from the baling chamber to be received by an ejection chute structure which ejects the divided bales in spaced relation to each other as the baling apparatus is moved along the field. The spaced relation can be longitudinal by ejecting the divided bales at staggered time and/or can be laterally spaced by turning the bales in the ejection chute structure.

4 Claims, 12 Drawing Sheets

(56) References Cited

U.S. PATENT DOCUMENTS

| | | | | |
|---|---|---|---|---|
| 5,829,238 | A * | 11/1998 | Branson | A01D 90/08 |
| | | | | 56/480 |
| 6,339,986 | B1 * | 1/2002 | Van Hierden | A01F 15/005 |
| | | | | 100/6 |
| 7,895,944 | B2 * | 3/2011 | Derstine | A01F 15/005 |
| | | | | 100/246 |
| 10,869,428 | B2 * | 12/2020 | Grady | B30B 9/3014 |
| 2014/0367965 | A1 * | 12/2014 | Vergote | A01F 15/14 |
| | | | | 100/33 R |
| 2016/0278294 | A1 * | 9/2016 | Younk | A01F 15/08 |
| 2016/0290798 | A1 * | 10/2016 | Verhaeghe | A01F 15/0825 |

* cited by examiner

BALING APPARATUS AND METHOD

CROSS-REFERENCE TO RELATED PATENT APPLICATION (0002) The present application is a continuation of U.S. patent application Ser. No. 17/127,112 filed Dec. 8, 2020, and U.S. patent application Ser. No. 16/025,751 filed Jul. 2, 2018, now U.S. Pat. No. 10,869,428 and claims priority therefrom.

BACKGROUND OF THE INVENTION

Field of the Invention (0002) The present invention relates to baling apparatus and methods wherein multiple bales of crop material from a field are formed simultaneously and distributed on the field in a manner to facilitate collecting the bales.

Brief Discussion of the Related Art

Picking up and baling of material in a field is an integral aspect of farming and is an expensive and labor-intensive process. The material normally is forage such as, for example, hay, biomass, alfalfa, straw, coastal Bermuda, and corn stalks and is referred to herein as crop material. Typically, crop material is picked-up by machinery and fed to a baling chamber where the crop material is compressed and tied to form bales. "Square" bales are preferred in that the square-shouldered bales facilitate stacking, delivery and use and as used herein, square bales means bales having square shoulders.

Attempts to improve baling efficiency have included the production of very large bales which are heavy, awkward, and difficult to handle, such that truck loads and storage are not maximized. That is, current baling apparatus and methods do not move the most amount of baled material in the least amount of time.

Another attempt to provide a more efficient baling process is described in U.S. Pat. No. 3,099,203 to Klemm et al by producing bales in pairs or sections of a reduced size. The Klemm et al baling machine utilizes a stationary blade mounted in a baling chamber and a movable second blade mounted on a plunger to be movable therewith. The stationary and movable blades have tapered cutting edges which exert a shearing action on material therebetween. The combination of stationary and movable blades has the disadvantage of requiring a complex blade arrangement in an attempt to prevent intermingling of fibers of the sections as the sections are discharged from the baling chamber.

SUMMARY OF THE INVENTION

The present invention overcomes the disadvantages of prior art baling techniques and increases the amount of crop material baled from a field in the least amount of time by dividing square bales into smaller bales and by distributing the bales in the field in a pattern to facilitate collecting the bales with conventional equipment.

In one aspect, the present invention divides crop material compressed in a baling chamber to increase the number of bales normally produced in the baling chamber by movement of a plunger in the baling chamber to discharge the divided bales simultaneously from the baling chamber and to separate the discharged divided bales using an ejection chute structure. The separation can be by longitudinal and/or lateral spacing. The baling apparatus is moved along a field by motive means, such as a tractor, and the path followed by the tractor is considered to be "longitudinal" as the term is used herein. To achieve longitudinal spacing of the divided bales, which are simultaneously received from the baling chamber, the divided or split bales are ejected at staggered times by slowing or stalling one bale in the ejection chute structure relative to the other bale. To achieve lateral spacing of the simultaneously received divided bales, the bales engage angled surfaces of the ejection chute structure to spread the bales apart. The angled surfaces can also be used to rotate the divided bales 90° to be set in an upright position in the field.

In another aspect, the present invention uses one or more vertically extending, laterally spaced stationary knives within a baling chamber to produce two or more square bales of crop material simultaneously in response to movement of a plunger within the baling chamber to compress the material to be baled against and past the knives and discharge the bales simultaneously from the baling chamber.

A further aspect of the present invention utilizes an ejection chute structure at the rear end of a frame carrying a baling chamber to receive discharged bales of crop material from the frame such that bales are discharged simultaneously from the baling chamber but ejected from the ejection chute structure at staggered times.

The present invention is generally characterized in baling apparatus including a frame movable along a field surface laden with crop material to be baled with a rear end for ejecting square bales of the crop material, a baling chamber carried on the frame and having an inlet therein for receiving the crop material to be baled, a pick-up unit coupled with the frame for picking up the crop material from the field and delivering the crop material to the baling chamber via the inlet, a stationary knife disposed in the baling chamber and extending vertically from the floor thereof, a plunger movable rearwardly within the baling chamber to compress the crop material and move the compressed crop material rearwardly toward the rear end of the frame to push the compressed crop material against and past the knife to be split and form first and second square bales of the crop material and an ejection chute structure disposed at the rear end of the frame to receive the first and second bales simultaneously and eject the first and second bales in spaced relation to each other as the frame is moved along the field.

The present invention is further generally characterized in a method of mechanically baling crop material in a field using a frame moved along the field including the steps of picking up the crop material and delivering the crop material to a pick-up chamber carried by the frame to create preformed flakes, forcing the preformed flakes into a baling chamber in a space between a plunger and a stationary splitting knife, moving the plunger toward the splitting knife to push the preformed flakes against and past the splitting knife to simultaneously form stacks of flakes on opposing sides of the splitting knife, tying the stacks of flakes to form first and second square bales of the crop material and ejecting the first and second bales from the frame in spaced relation to each other via an ejection chute structure as the frame is moved along the field to form a first line of the first bales and a second line of the second bales spaced from the first line.

The method according to the present invention as described above can also be implemented to produce more than two bales simultaneously by using a plurality of splitting knives in the baling chamber.

The present invention is additionally generally characterized in apparatus for distributing bales of picked-up crop material on a field including a frame adapted to be moved along the field and carrying bales of picked-up crop material to be distributed on the field, the frame having a rear end discharging the bales of picked-up crop material from the frame, simultaneously, in groups and an ejection chute structure located at the rear end of the frame for disposing each of the bales in a group in a time-staggered manner to form a bale collection path formed of substantially parallel lines of the bales.

Some of the advantages of the present invention over prior art baling machines, apparatus and methods are that much more crop material can be baled and collected per hour to produce at least twice the production of a conventional baler and at a rate of at least twice the bales per hour, the cost to a farmer is reduced, relating to equipment, labor and fuel, bales are distributed on a field in a position to facilitate collecting the bales, and stacking of bales is facilitated due to the size and orientation of the bales.

Other aspects and advantages of the present invention will become apparent from the following description of the present invention taken in conjunction with the accompanying drawings wherein like parts in each of the several figures are identified by the same reference characters.

DETAILED DESCRIPTION OF THE INVENTION

Figure 1:
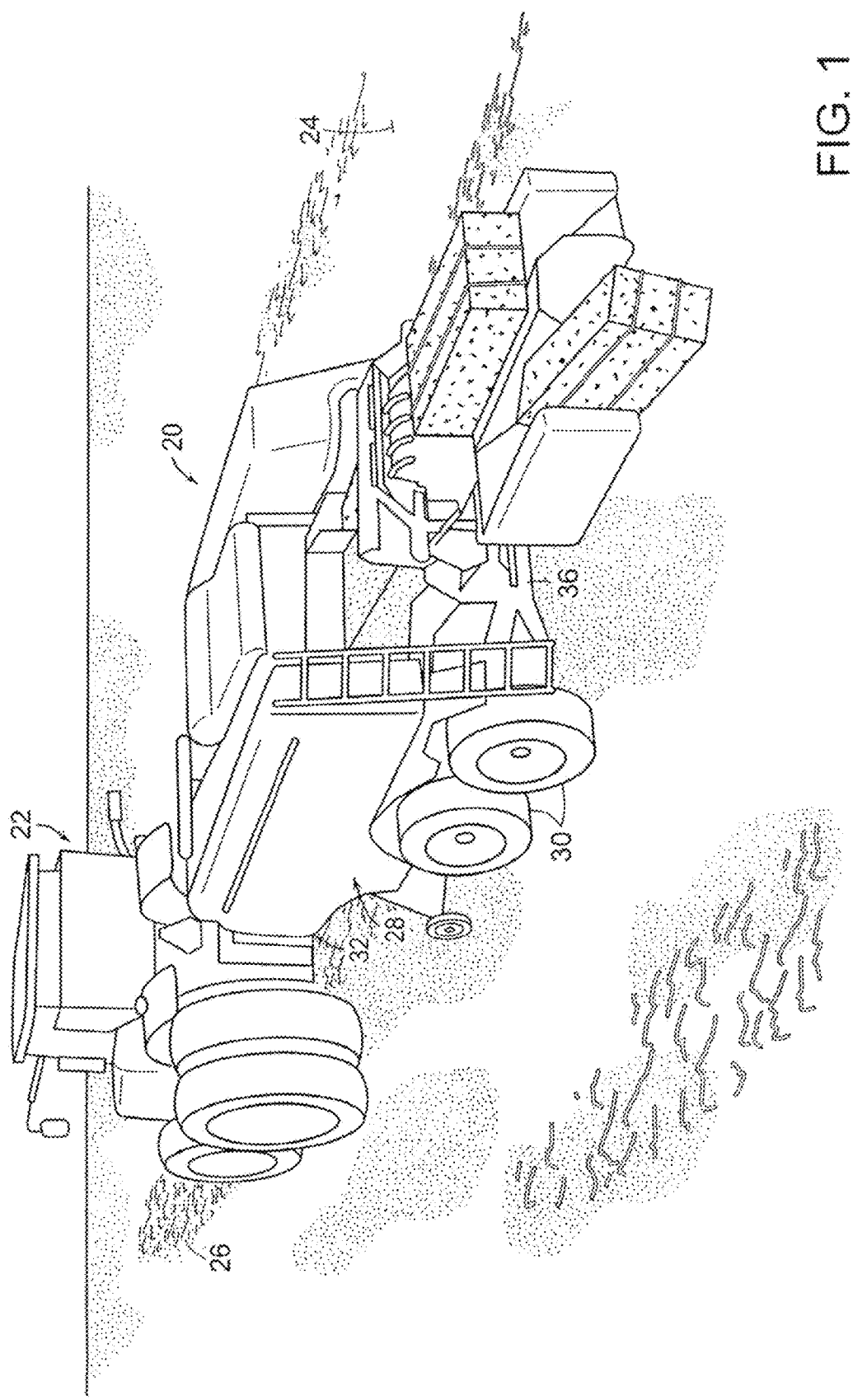
FIG. 1 is a perspective view of the baling apparatus of the present invention in use in a field.

With reference to the drawings, baling apparatus 20 is shown in FIG. 1 for use with motive means, such as a tractor 22, for moving the baling apparatus 20 along a field 24 laden with crop material 26 to be baled. As shown in FIGS. 1-4, the baling apparatus includes a frame 28 having wheels 30 on opposite sides thereof, a front or leading end 32 coupled with the tractor via a hitch 34 and a rear or trailing end 36 for ejecting bales of the crop material to be distributed on the field. The baling apparatus 20 is shown in FIG. 1 as being pulled along the field 24 by a tractor; however, the baling apparatus 20 can be self-propelled to move in the manner exemplified by the Freeman Division of Allied Systems Company Model 380, Self Propelled Baler.

Figure 2:
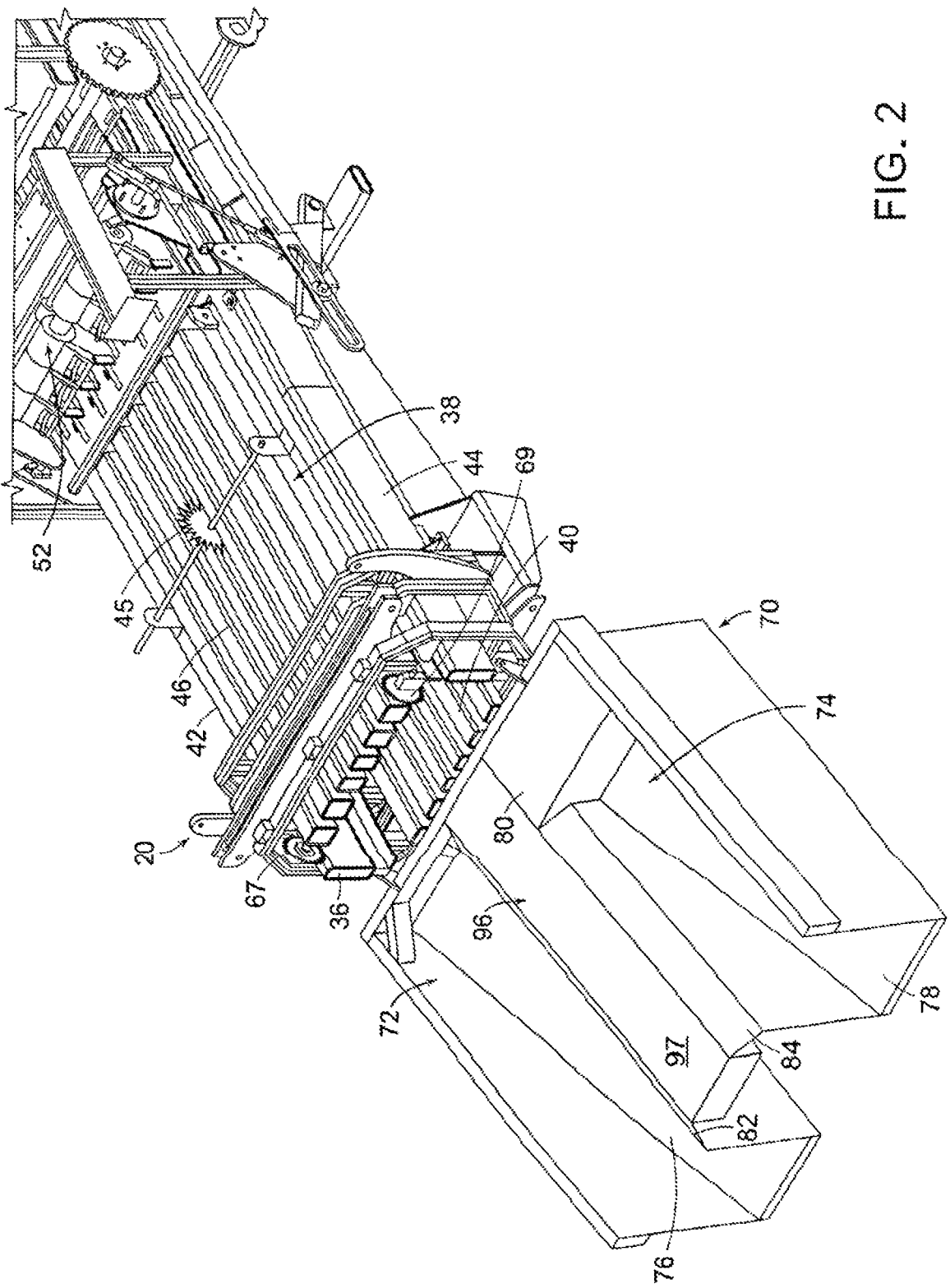
FIG. 2. is a broken perspective view of the baling apparatus of the present invention.
Figure 3:
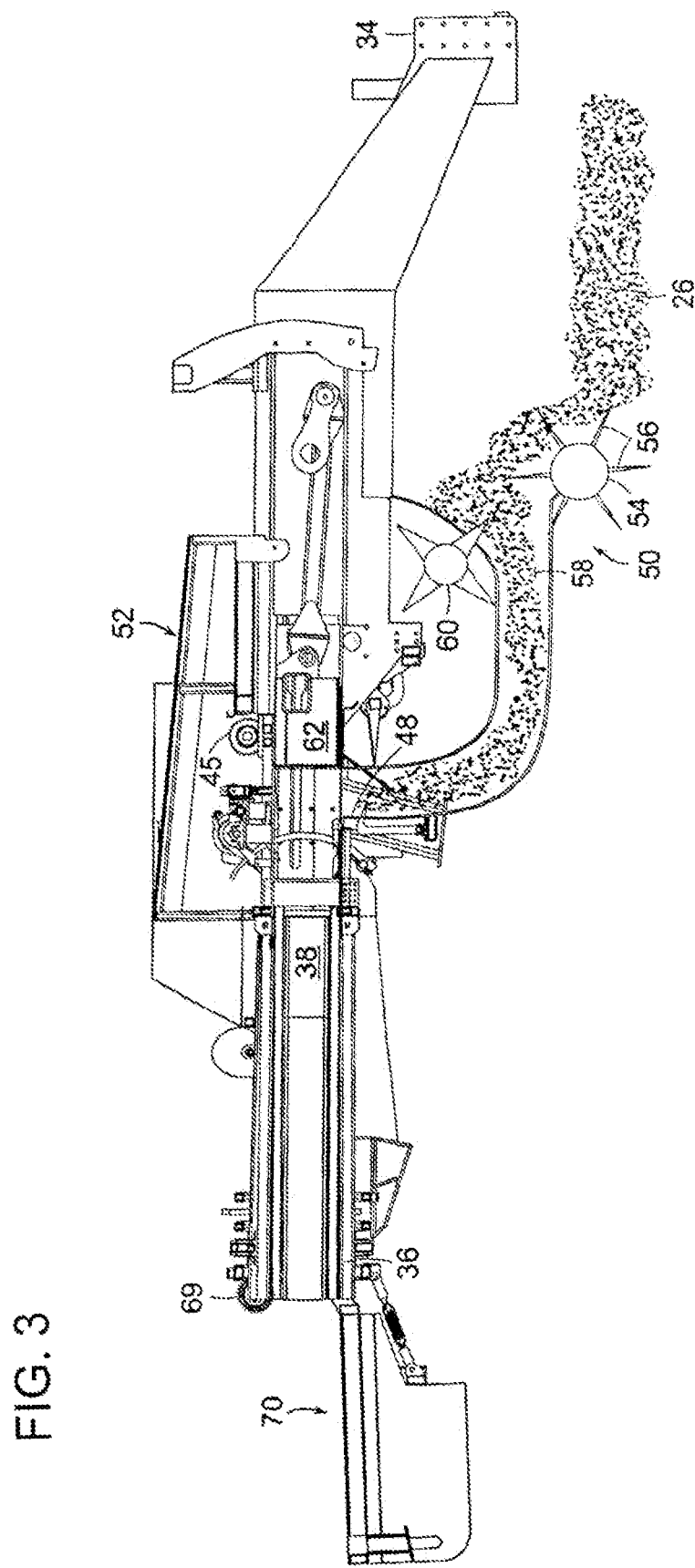
FIG. 3 is a side view of the baling apparatus of the present invention in partial section with parts broken away.
Figure 4:
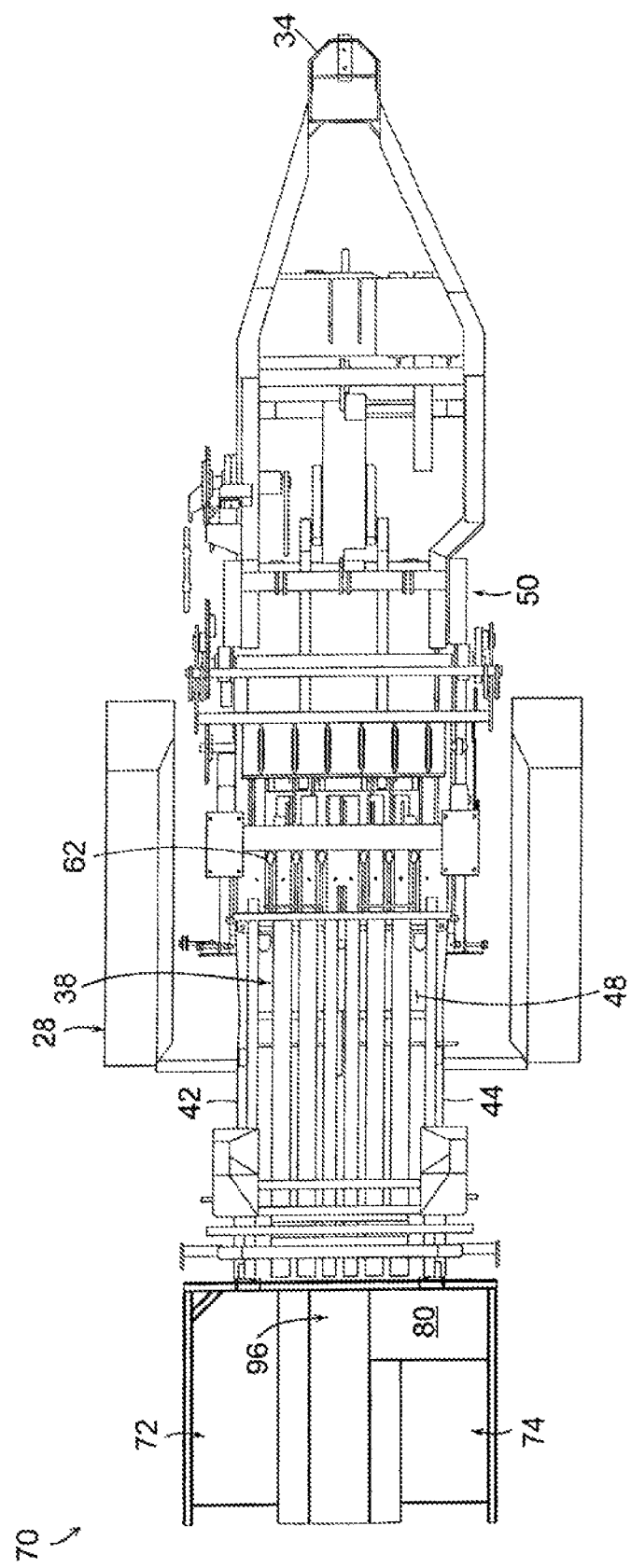
FIG. 4 is a top view of the baling apparatus of the present invention shown in FIG. 3.
Figure 5:
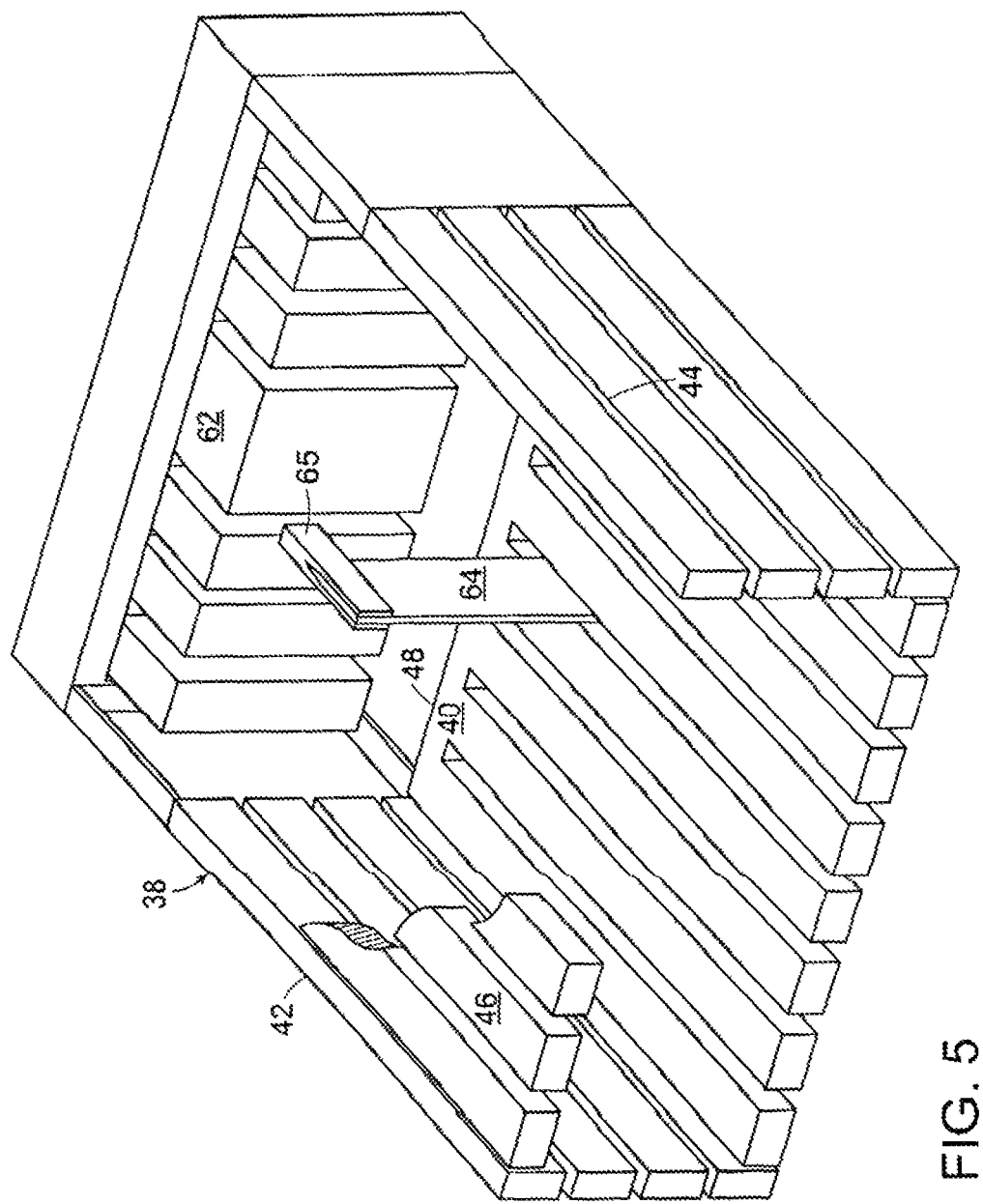
FIG. 5 is a broken perspective view of the baling chamber of the baling apparatus of the present invention.

A baling chamber 38, shown in FIG. 5, is carried on the frame between the front and rear ends, as shown in FIGS. 2, 3 and 4, and has a floor or bottom 40 extending horizontally along the frame, spaced vertical side walls 42 and 44 extending vertically from the floor, a top or roof 46 and an inlet 48 located in the floor 40 above a pickup unit 50. The top, the floor and the side walls are formed of spaced members to reduce weight and provide gaps to accommodate needles and twine of knot tying means 52 carried by the frame and to allow the walls to be adjusted to control compression of bales in the baling chamber. The knot tying means is of conventional construction such as the knotters used in the Freeman Division of Allied Systems Company Model 370 Baler.

The pickup unit 50 is coupled with frame 28 and includes a rotating pickup head 54 with tines 56 extending radially outward from the head such that the tines rotate and pick up the crop material 26 and send it rearward to a pick up chamber 58 to create preformed flakes of the crop material. The preformed flakes are supplied to the inlet of the baling chamber by force from rotating fingers 60. The pickup unit and chamber are of conventional construction, such as the pickup and packer used in the Heston/Massey Ferguson Large Square Baler Model 2170.

Figure 6:
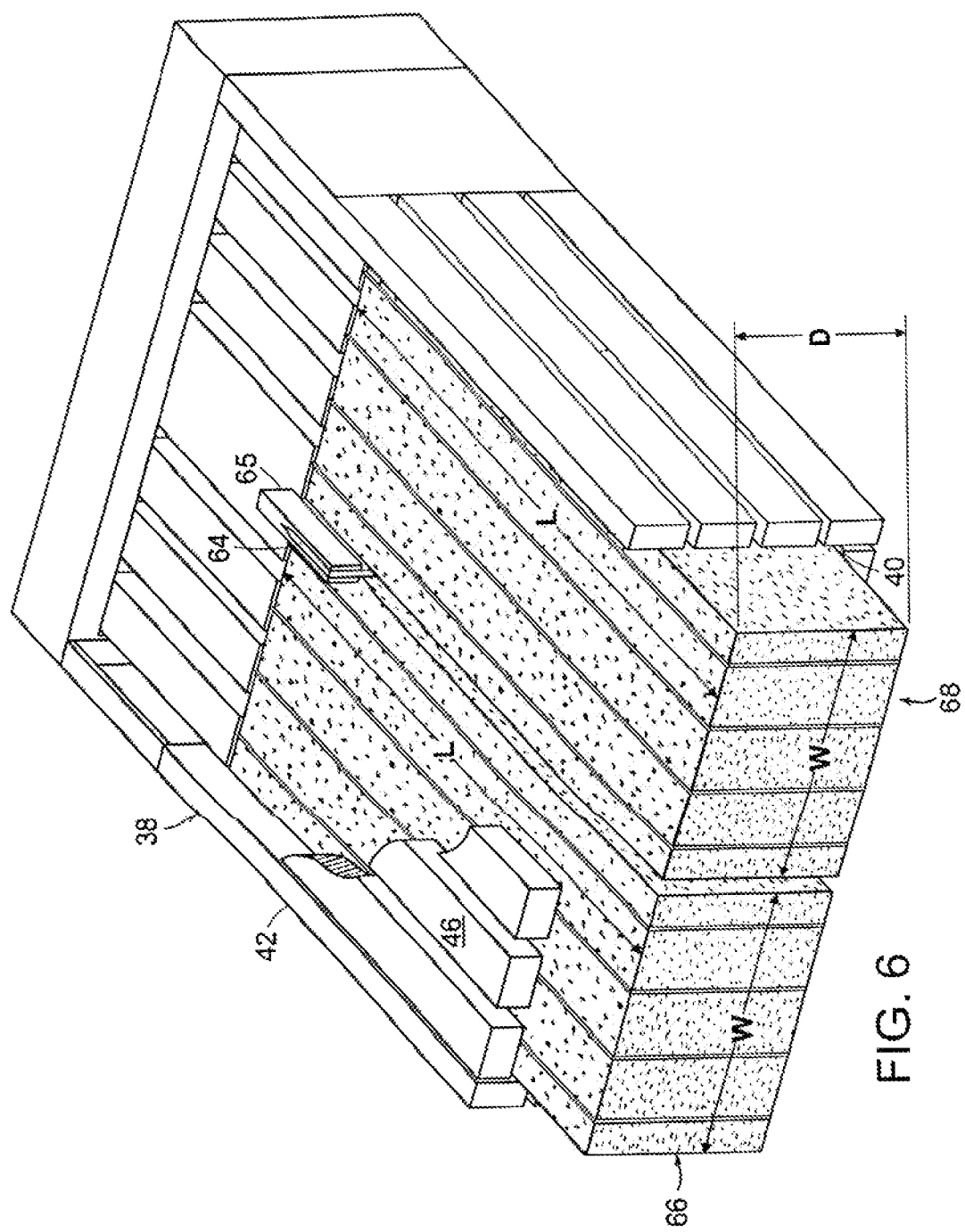
FIG. 6 is a broken perspective view of the baling chamber of FIG. 5 after initial splitting of crop material to be baled.
Figure 7:
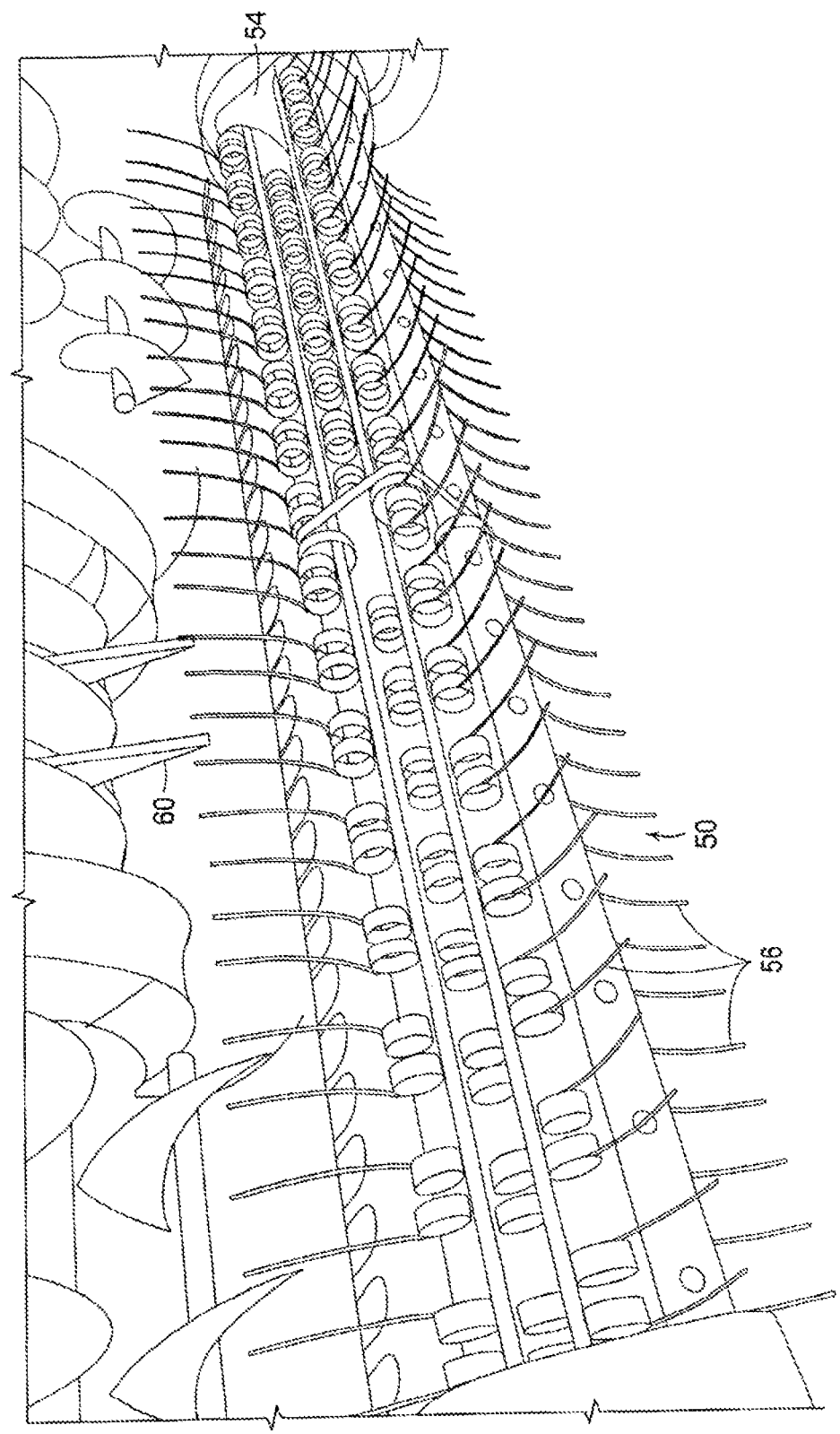
FIG. 7 is a front view of the baling apparatus of the present invention showing the pickup unit.
Figure 9:
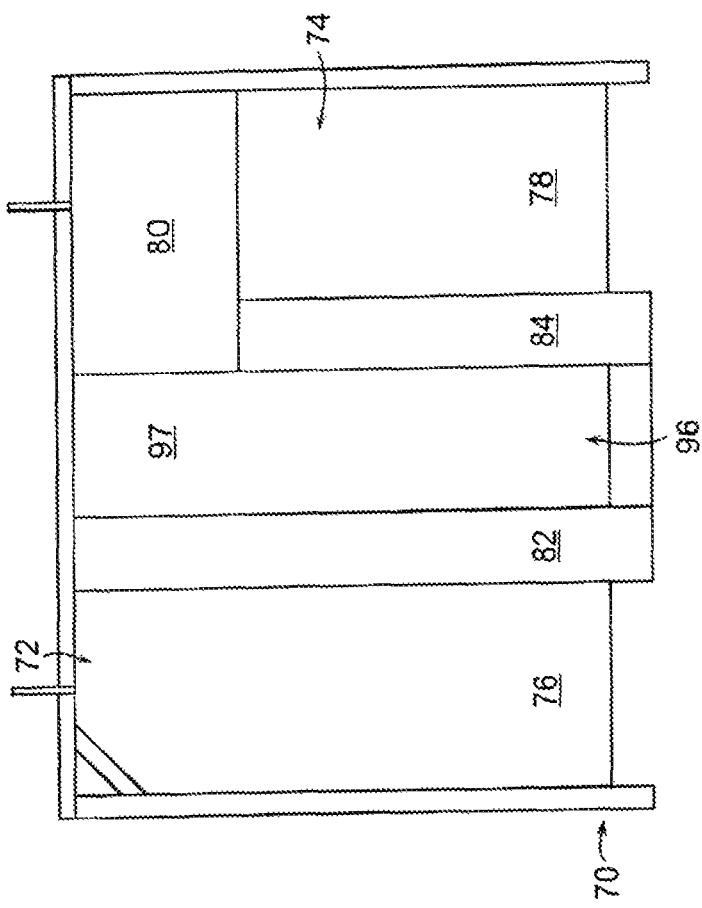
FIG. 9 is a top view of the ejection chute structure shown in FIG. 8.
Figure 8:
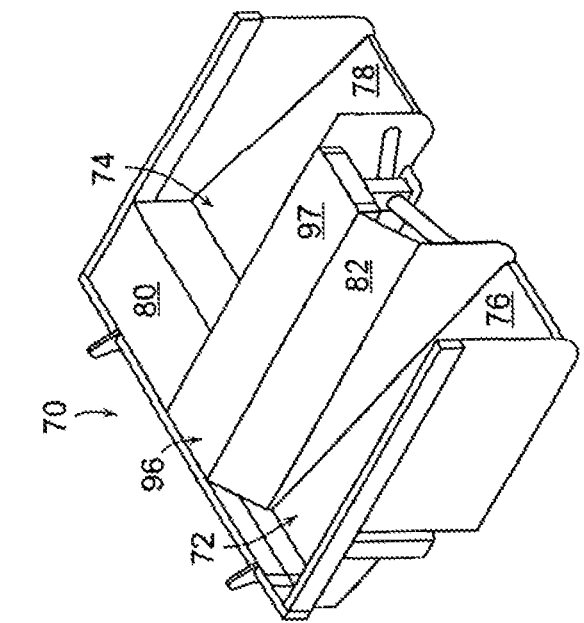
FIG. 8 is a perspective view of the ejection chute structure of the baling apparatus of the present invention.

A plunger 62 is movably disposed in the baling chamber to have a rest position, as shown in FIG. 5, forward of the inlet 48. The plunger is hydraulically moved rearward to compress crop material received in the baling chamber from the pickup unit such that the plunger pushes the compressed crop material against and past a splitting knife 64 which is stationary and extends vertically from the floor 40 in a plane parallel with the vertical side walls 42 and 44. Movement of the plunger to form successive bales from successive flakes is controlled by a toothed wheel 45 disposed on the roof of the baling chamber to be rotated as crop material passes thereby and provide signals to control circuitry such as a computer. Control of the size and weight of the split bales is achieved by rotary sensors 67 and 69 which sense the parameters of each of the bales and provide an indication of any need to vary the flow of crop material to the baling chamber. The top of the splitting knife is mounted at 65 to be at the same level as the roof 46 of the baling chamber. The compressed crop material is thus split by movement of the plunger relative to the knife to form first and second square bales of the crop material 66 and 68. The plunger comes close to contacting the splitting knife but, preferably, does not contact the splitting knife. The splitting knife 64 has angled vertical cutting edges tapering to a leading cutting edge such that the knife assists center splitting of the compressed crop material. The crop material received at the baling chamber inlet is in the form of preformed flakes, and the plunger mashes the preformed flakes of crop material into the face of the splitting knife to split each flake as it enters the bale forming portion of the baling chamber. Accordingly, each flake of the crop material is formed into two bales in the baling chamber while each bale is being made. A completed bale is typically made up of 12 to 15 flakes and can range from 80 pounds up to 180 depending on desired bale weight. The portion of the baling chamber rearward of the splitting knife forms a tension chamber controlled by hydraulic cylinders with the use of a computer to create the desired weight in each bale. The tension chamber squeezes the top, bottom and both sides of the bales to achieve the desired weight and size of each bale. The bales 66 and 68 are tied by the knotting means 52 and after the crop material is split by the knife. The splitting knife is mounted to be stationary and achieves splitting of the crop material without movement of the knife. As shown in FIG. 6, the bales 66 and 68 are discharged simultaneously from the open end of the baling chamber with the bales positioned close to each other, that is, separated primarily only by the width of the splitting knife. In the embodiment shown in FIG. 6, the depth D of the bales is less than the width W of the bales and the length L of the bales.

Figure 10:
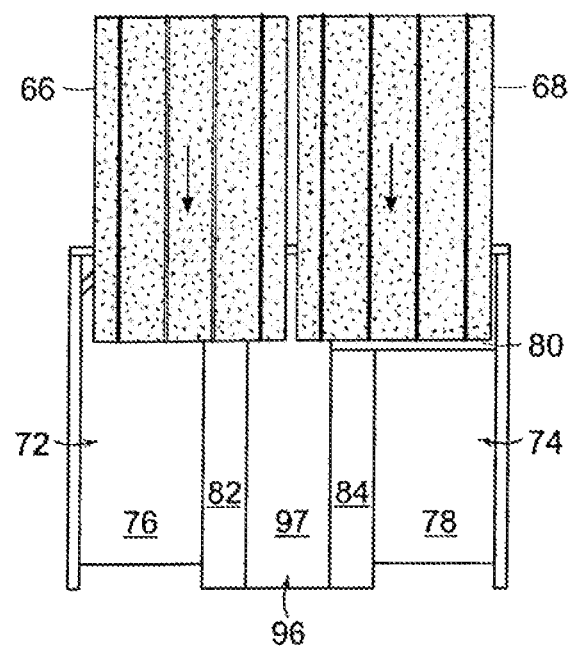
FIG. 10 is a top view showing the ejection chute structure simultaneously receiving divided bales discharged by the baling chamber.
Figure 11:
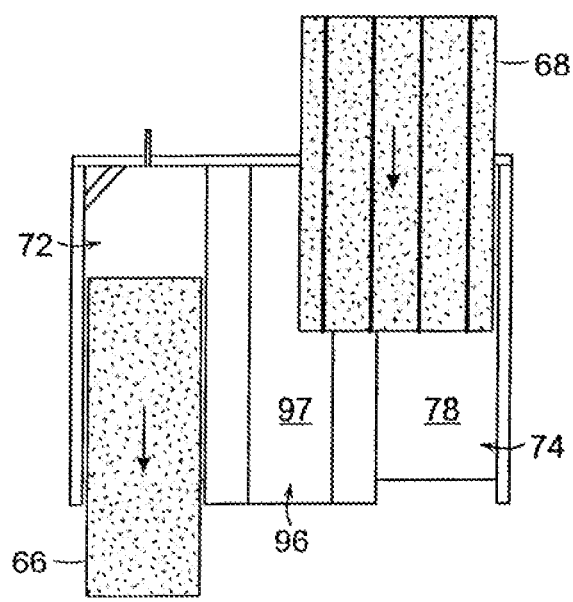
FIGS. 11 and 12 are top and perspective views, respectively, of the ejection chute structure slowing one bale and turning the other bale.
Figure 12:
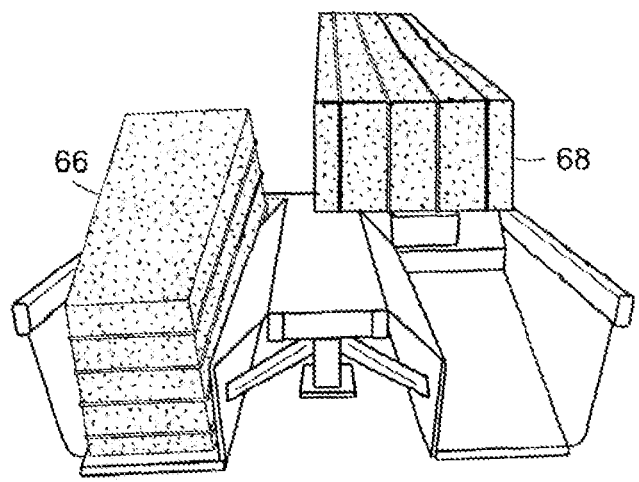

An ejection chute structure 70 is disposed at the rear end 36 of the frame 28 and simultaneously receives the bales 66 and 68 as the bales are discharged from the exit of the baling chamber, as shown in FIG. 10. The ejection chute structure 70 is pivotally carried at the rear end of the frame and includes first and second slideways 72 and 74 extending from the rear end of the frame downwardly toward the field surface. The first slideway 72 has a sliding surface 76 receiving the first bale 66 substantially directly from the baling chamber. The second slideway 74 has a sliding surface 78 receiving the second bale 68 from the baling chamber after the first bale is received by the sliding surface 76 of the first slideway. The second slideway 74 is configured to stall or delay rearward movement of the second bale 68. In one embodiment, the second slideway has a shelf 80 disposed between the discharge end of the baling chamber and the sliding surface 78 such that the second bale 68 does not drop directly onto the sliding surface. Additionally, the ejection chute structure has angled surfaces to turn or rotate the bales, preferably by 90°, such that the bales are "stood up" before being ejected from the end of the ejection chute structure. Slideway 72 has an angled surface 82 disposed above sliding surface 76 such that the first bale 66 is turned 90° by engagement with the angled surface 82 as shown in FIGS. 10, 11, and 12. Similarly, slideway 74 has an angled surface 84 disposed above the sliding surface 78 to turn the second bale 90°. The angled surfaces 82 and 84 are formed on a central bale guide 96 disposed between the slideways 72 and 74 such that the angled surfaces 82 and 84, which extend from a flat top 97 coplanar with shelf 80, are angled away from the center of the ejection chute structure. Accordingly, the first and second bales are ejected in spaced relation to each other as the frame is moved along the field. The spaced relation can be longitudinal, that is, along the path upon which the frame is moved, due to time staggering created by slowing the second bale 68 relative to the first bale 66 and/or lateral, due to the angled surfaces in the ejection chute structure moving the bales outwardly relative to each other and rotating the bales to increase the lateral spacing therebetween.

Figure 13:
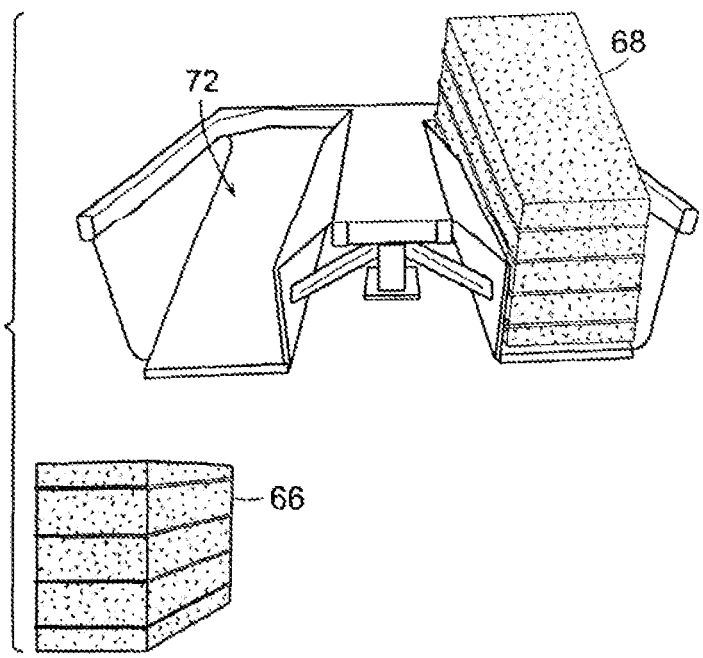
FIG. 13 is an exploded, perspective view showing manipulation of both bales.

FIG. 10 shows the first and second bales being received by the ejection chute structure simultaneously. FIG. 11 shows the first bale 66 having been received on the sliding surface 76 of the slideway 72 while the second bale 68 is supported on the shelf 80 and the flat top 97 of the central bale guide 96 and to be stalled or slowed before it is received on the sliding surface 78 of slideway 74. FIGS. 11 and 12 illustrate the 90° turning of bale 66 while bale 68 has not yet turned. FIG. 13 shows both bales having been turned 90°, it being noted that bale 66 has been delivered to the field while bale 68 has not yet been delivered to the field so as to create time staggering or longitudinal spacing of the bales. Accordingly, as the bales exit the rear of the baling apparatus, one bale is immediately stood up and dropped to the ground while the second bale is stalled via the longer platform above the sliding surface such that the second bale sits for a period of time, for example 10 seconds, to create the stall effect. The ejection of bales in spaced relation to each other facilitates picking up the bales where bale stacking equipment can only pick up one row of bales at a time. The spaced relation of the bales allows the same bale stacker to pick up both bales whereas, if the bales were sitting side by side, the bales stacker would have to make two trips across the same path.

Figure 14:
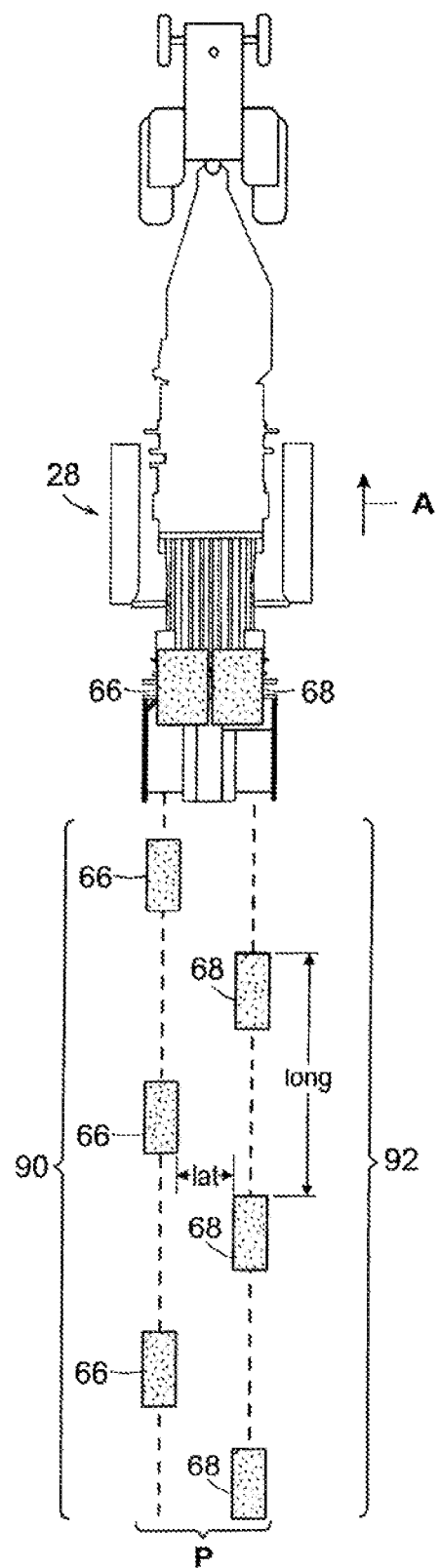
FIG. 14 is a representation of the positioning of the bales in a field for collection and showing the increased lateral and longitudinal spacing therebetween.

The manipulation of the bales to provide the spaced relation to each other in the field is illustrated in FIG. 14 wherein the movement of the frame along the field is represented by arrow A, longitudinal spacing between bales is designated as "long" and lateral spacing between bales is designated as "lat." The first bales form a first line of bales 90 and the second bales form a second line of bales 92 spaced from the first line of bales and substantially parallel to the first line. The frame moves along the field carrying bales of picked up crop material to be distributed on the field with the ejection chute structure located at the rear end of the frame disposing each of the bales in a group in a time-staggered manner to form a bale collection path P formed of substantially multiple parallel lines of the bales.

Figure 15:
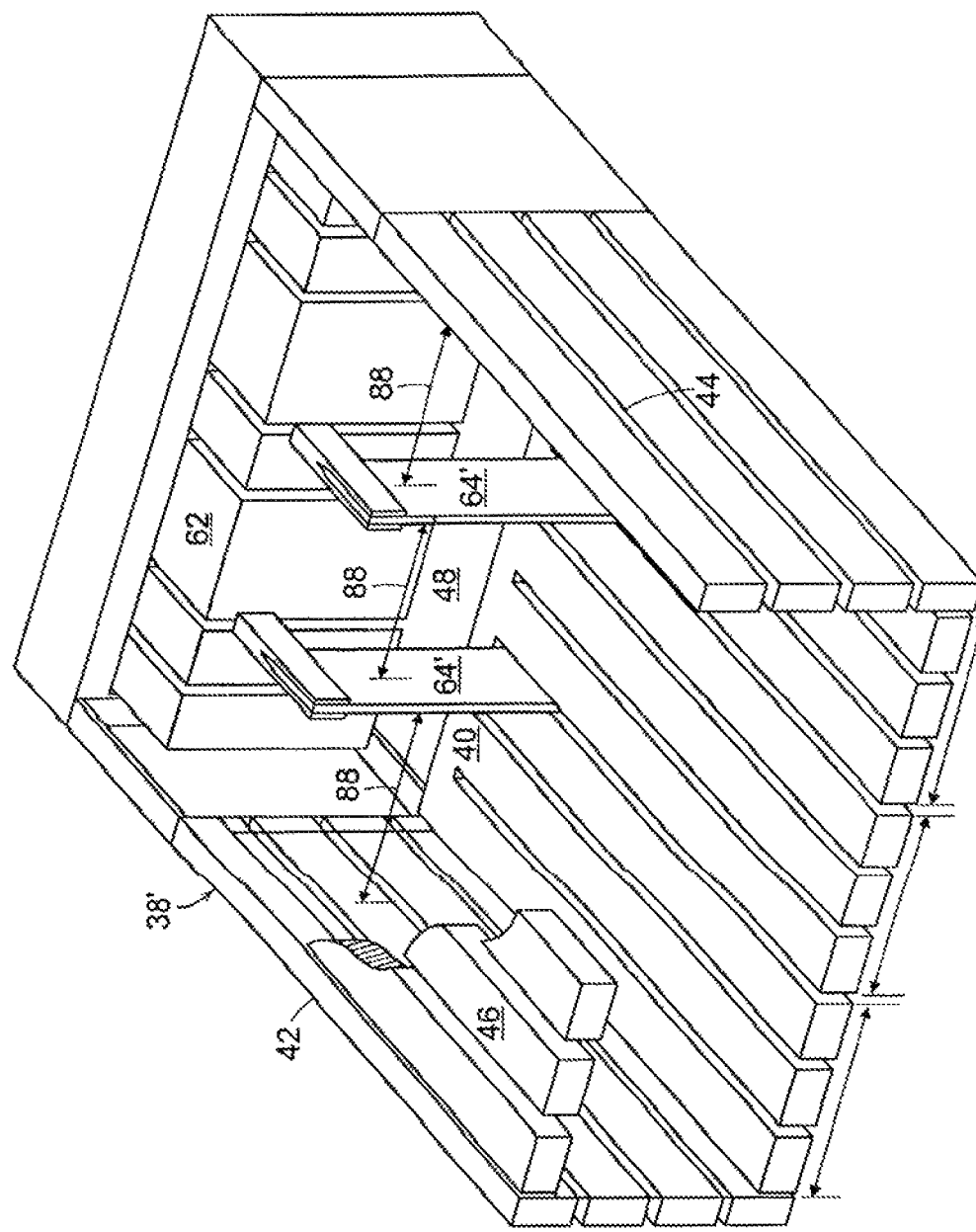
FIG. 15 is a broken perspective of a modified baling chamber for use with the baling apparatus of the present invention.

FIG. 15 shows a modified baling chamber 38' utilizing a plurality of stationary splitting knives 64' extending vertically from the floor in spaced planes parallel to the vertical side walls of the baling chamber. The splitting knives define baling spaces 88 between the splitting knives 90 and between the splitting knives and the baling chamber side walls. Movement of the plunger rearwardly within the baling chamber compresses the crop material to be baled and moves the compressed crop material rearwardly toward the rear end of the frame pushing the compressed crop material against and past the plurality of splitting knives to be split and form bales of the crop material in each of the baling spaces 88. With the modified baling chamber shown in FIG. 15, an ejection chute structure will be used having multiple slideways with the number of slideways equal to the number baling spaces such that each slideway can receive an individual bale after splitting.

Inasmuch as the present invention is subject to many variations, modifications, and changes in detail, it is intended that the subject matter discussed above and/or shown in the accompanying drawings be interpreted as illustrative only and not taken in a limiting sense.

What is claimed is:

1. Apparatus for baling crop material picked up from a field as said apparatus is moved along the field, said apparatus comprising a baling chamber having an inlet and an open exit end, said inlet receiving crop material from the field to form first and second square bales of the crop material for simultaneous discharge of said first and second square bales from said open exit end of said baling chamber; and an ejection chute structure simultaneously receiving said first and second square bales discharged from said open exit end of said baling chamber said ejection chute structure including a slideway arrangement, wherein said slideway arrangement is configured to slow one of said first or second square bales relative to the other of said square bales to eject said first and second square bales in time staggered spaced relation.

2. The baling apparatus as recited in claim 1 wherein said ejection chute structure includes a shelf for delaying said one of said first or second square bales relative to the other of said first or second square bales.

3. The baling apparatus as recited in claim 1 wherein said baling chamber includes a stationary splitting knife to form said first and second square bales.

4. The baling apparatus as recited in claim 1 wherein said slideway arrangement of said baling chamber includes a first slideway portion receiving and slowing said one square bale and a second slideway portion receiving said other of said square bales.

* * * * *

UNITED STATES PATENT AND TRADEMARK OFFICE
CERTIFICATE OF CORRECTION

| | | |
|---|---|---|
| PATENT NO. | : 12,219,902 B2 | Page 1 of 1 |
| APPLICATION NO. | : 18/218994 | |
| DATED | : February 11, 2025 | |
| INVENTOR(S) | : Michael Jason Grady | |

It is certified that error appears in the above-identified patent and that said Letters Patent is hereby corrected as shown below:

In the Claims

Claim 4, Line 2 replace "baling chamber" with "ejection chute structure".

Signed and Sealed this
Twenty-eighth Day of October, 2025

John A. Squires
*Director of the United States Patent and Trademark Office*